United States Patent
Shagbazyan (10) Patent No.: US 7,347,474 B2
(45) Date of Patent: Mar. 25, 2008

(54) TRUCK BED EXTENSION

(76) Inventor: Armen Shagbazyan, 1021 Linden Ave., #8, Glendale, CA (US) 91201

( * ) Notice: Subject to any disclaimer, the term of this patent is extended or adjusted under 35 U.S.C. 154(b) by 0 days.

(21) Appl. No.: 11/259,680

(22) Filed: Oct. 26, 2005

(65) Prior Publication Data

US 2007/0090661 A1   Apr. 26, 2007

(51) Int. Cl.
*B62D 33/027* (2006.01)
(52) U.S. Cl. .................. 296/26.1; 296/61; 293/118
(58) Field of Classification Search .......... 296/61, 296/26.09, 26.1, 57.1; 293/118
See application file for complete search history.

(56) References Cited

U.S. PATENT DOCUMENTS

| | | | |
|---|---|---|---|
| 3,695,666 A * | 10/1972 | Corson ................ 293/118 |
| 5,803,523 A * | 9/1998 | Clark et al. ............. 296/26.1 |
| 6,155,622 A | 12/2000 | Reed |
| 6,158,797 A | 12/2000 | Bauer |
| 6,227,593 B1 | 5/2001 | De Valcourt |
| 6,354,788 B1 | 3/2002 | Adams |
| 6,357,813 B1 | 3/2002 | Vandeberghe et al. |
| 6,378,926 B1 | 4/2002 | Renze et al. |
| 6,419,292 B1 | 7/2002 | Calcote et al. |
| 6,461,096 B1 | 10/2002 | Mentele et al. |
| 6,513,850 B1 | 2/2003 | Reed |
| 6,575,509 B1 * | 6/2003 | Golden ................ 293/119 |
| 6,601,895 B1 * | 8/2003 | Tannenbaum et al. ... 296/26.09 |
| 6,827,383 B2 | 12/2004 | Lacy |
| 6,890,013 B2 | 5/2005 | Lacy |
| 6,955,519 B1 * | 10/2005 | Ferderber ............ 414/680 |
| 7,128,357 B1 * | 10/2006 | Carroll ............... 296/61 |
| 2002/0094261 A1 * | 7/2002 | Fischer et al. ........ 414/537 |

* cited by examiner

*Primary Examiner*—Dennis H Pedder
(74) *Attorney, Agent, or Firm*—Patel & Alumit, PC; Edwin Tarver; Ty Ung (57) ABSTRACT

An extension and ramp assembly for use with the truck beds. The assembly comprises a truck bed floor portion and a cargo bed door portion. The truck bed floor portion mainly includes a plurality of shafts and a motor coupled with a bumper, which provides power to extend and retract the bumper along with the truck bed. The cargo bed door portion mainly includes a cargo bed door that is pivotally attached to the bumper such that it can be moved away from the rear end of the truck bed to form an extension parallel to the truck bed. The truck bed when fully extended can be moved down towards the ground to form a sloping surface. The sloping surface formed by the truck bed in conjunction with the pivotally moved down cargo bed door acts as a ramp-like structure.

6 Claims, 15 Drawing Sheets

TRUCK BED EXTENSION

CROSS-REFERENCE TO RELATED APPLICATION

None

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates in general to extendable truck beds, and more particularly, to a truck bed extension structure and mechanism that will enable the truck bed to extend beyond the frame of a truck and tilt into a slanting position to form a ramp-like structure for convenient loading and unloading.

Many devices and structures for providing a ramp system and extension, which in turn may provide the ramp system, to the truck beds have been known in the art. The basic method to provide a ramp includes tilting of an extended structure such that its rear end touches the ground forming a sloping surface. Detachable ramps are also used to provide the sloping surface. The basic method for providing an extension mainly involves extending the truck bed with appropriate means, manual or automatic, or attaching a separate structure at the rear end of the truck bed.

Numerous structures and mechanisms can be adopted to modify the hauling area of a truck. For example, U.S. Pat. No. 6,461,096 to Mentele discloses a tilt bed for a truck or a trailer that provides a ramp. The tilt bed comprises a frame, and a deck mounted on and supported by the frame, rollers connected to the front portion of the deck, tracks for guiding the rollers, and a hydraulic cylinder with a piston that has a first end connected to the frame and a second end connected to the bed. As the piston moves from an extended state into a retracted state, it causes the trailer bed to move in a rearward position. At the same time, the tracks force the rollers in an upward motion and cause the trailer bed to tilt.

U.S. Pat. No. 6,378,926 to Renze discloses a truck bed extender apparatus for increasing the load capacity of a pickup truck. The apparatus comprises four hinged basic elements including a pair of side panels, a tailgate, and a platform that is secured to the tailgate of the truck. The panels are held in their upright positions by pin locks and removably attached to the sides of the truck bed by adjustable latch brackets. Folding the side panels inward and rotating the assembly by 270 degrees down for loading or unloading can fold the assembly.

U.S. Pat. No. 6,158,797 to Bauer discloses a truck bed extension that is convertible into a ramp. The truck bed extension comprises three panels, including a back wall and two sidewalls, which are hinged together to allow the truck bed extension to be straightened when detached from the truck bed and used as a ramp or ladder. The truck bed extension includes rotational stops or rotational locks which maintain the extension in a straight condition when unfolded for use as a ramp. The rotational stops may take the form of U-channel rails protruding from the outside/bottom of the extension.

In U.S. Pat. No. 6,354,788 to Adams a dump truck with a ramp assembly is disclosed. The truck mainly comprises a conventional frame, a truck bed mounted to the frame, a ramp assembly movably attachable to the rear end of the bed, and hydraulic cylinders. The ramp assembly is selectively moveable between a lowered position and a raised position by actuating the hydraulic cylinders. In the lowered position, the ramp extends from the truck bed downwardly to the ground to allow equipment to be driven onto the back of the truck. In the raised position, the ramp assembly is raised to a position above the bed of the truck to allow the truck bed to be raised to its dumping position.

Although numerous designs and mechanisms of the truck bed assemblies, such as the above devices, are known in the art, there is a need for an efficient and convenient automatic mechanism, which can be achieved by an improved truck bed extension and ramp assembly of the present invention. Other objects of the present invention will become better understood with reference to the appended Summary, Description, and Claims.

SUMMARY

The present invention is directed to a truck bed extension/ramp assembly and the related mechanism for use with the truck beds. The truck bed mainly comprises of a cargo bed, a cargo bed frame, a bumper, and a cargo bed door. The extension/ramp assembly includes a plurality of shafts, motors or power sources, and fastening means.

According to the preferred embodiment, two bumper shafts are connected to the bumper at one of their ends. Two bumper shaft holders are attached to the frame to hold the bumper shafts at their other ends. A ramp is attached to the bumper with a fastening means. Two exterior bumper shafts are attached to the cargo bed frame to receive the bumper shafts. A threaded bumper motor shaft is attached to a motor/housing, which is placed inside and coupled to the bumper. A threaded exterior motor shaft is attached to the cargo bed floor to receive the bumper motor shaft. The motor when activated rotates the threaded bumper motor shaft, and thus a linear motion is induced. This linear motion will push or pull the bumper and the bumper shafts, thereby extending or retracting the truck bed.

A cargo bed door is pivotally attached to the bumper with a fastening means, such that it can be moved down and away from the rear end of the truck bed. A cargo bed door motor/housing is attached to the cargo bed door. A cargo bed door motor shaft is attached to the cargo bed door motor and a plastic net is connected to it. Upon the activation of the cargo bed door motor, the cargo bed door motor shaft is rotated thereby opening and closing (winding and unwinding) the shafts. The cargo bed door portion mainly comprises a cargo bed door 16, a cargo bed door motor/housing 17, and a plurality of shafts.

The bumper motor, cargo bed door motor, and their respective activation means are in communication with each other. The truck bed when fully extended can be moved down towards the ground to form a sloping surface. Finally, the sloping surface formed by the truck bed in conjunction with the pivotally moved down cargo bed door will act as a ramp-like structure for convenient loading and unloading.

FIGURES—REFERENCE NUMERALS

10 . . . Truck Cab
11 . . . Cargo Bed
12 . . . Cargo Bed Frame
13 . . . Bumper
14 . . . Ramp
15 . . . Bumper Motor
16 . . . Cargo Bed Door
17 . . . Cargo Bed Door Motor
18 . . . Bumper Shaft
19 . . . Opening
20 . . . Bumper Shaft Holder
21 . . . Bolt
22 . . . Nut
23 . . . Exterior Bumper Shaft
24 . . . Electrical Wire
25 . . . Bumper Motor Shaft
26 . . . Exterior Motor Shaft
27 . . . Bumper Motor Switch
28 . . . Hinge
29 . . . Cargo Bed Door Motor Shaft
30 . . . Cargo Bed Door Motor Switch
31 . . . Plastic Net
32 . . . Hook
33 . . . Cargo Bed Door Handle
34 . . . Tail Light

DETAILED DESCRIPTION

Referring to the drawings, the preferred embodiment of a truck bed extension/ramp assembly is illustrated in FIGS. 1 through 8. The assembly can be mainly divided into a truck bed floor portion and a cargo bed door portion. The truck bed floor portion manly comprises a cargo bed 11, a cargo bed frame 12, a bumper 13, a ramp 14, a motor/housing 15 coupled with the bumper, and a plurality of shafts. The cargo bed door portion mainly comprises a cargo bed door 16, a cargo bed door motor/housing 17, and a plurality of shafts.

Referring to FIGS. 1a through 4b, two bumper shafts 18 are connected to the bumper 13, which has two openings 19 on the top for a human hand to fit in and hold the bumper 13. Two bumper shaft holders 20 are attached to the cargo bed frame 12 to hold the bumper shafts 18. The ramp 14 is attached to the bumper 13 with a plurality of bolts 21 and nuts 22. The cargo bed 11 and the ramp 14 have a threaded hole at the front end (towards the truck cab 10) to be coupled together with a bolt 21, as shown in FIG. 1b. The bumper shafts 18 are surrounded with threaded holes that can be coupled to the cargo bed floor and a pair of exterior bumper shafts 23 with a plurality of bolts. The exterior bumper shafts 23 are attached to the cargo bed frame 12 to receive the bumper shafts 18.

Figure 3:
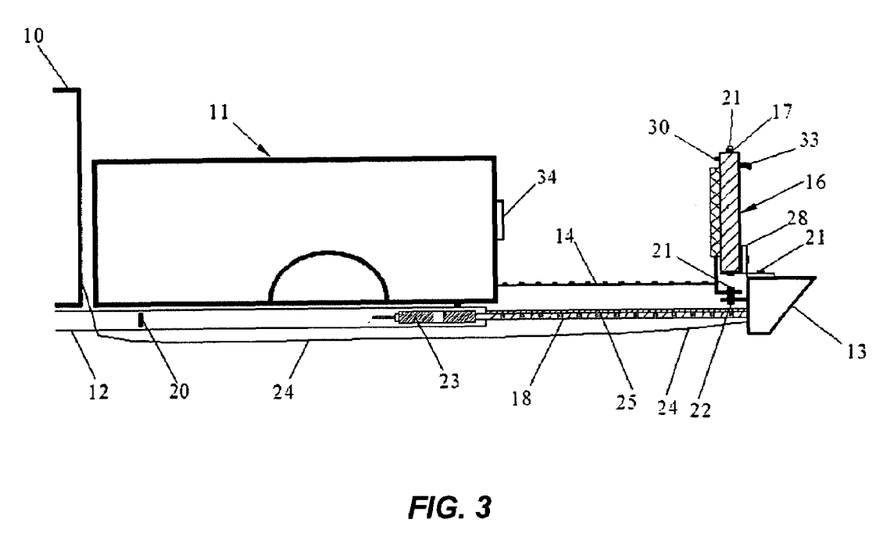
FIG. 3 is a right side view of the truck bed extension/ramp assembly with opened bumper.
Figure 4A:
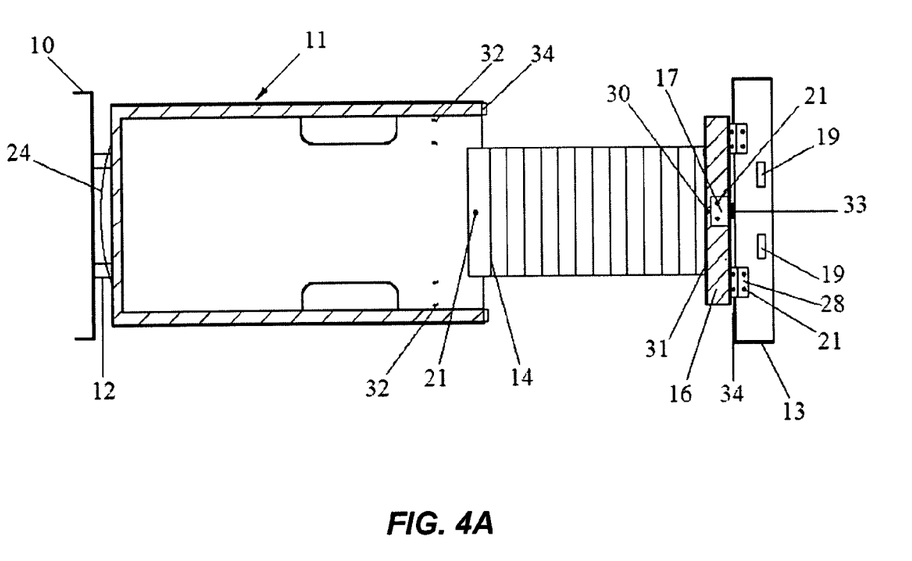
FIG. 4a is a top view of the truck bed extension/ramp assembly with opened bumper.
Figure 4B:
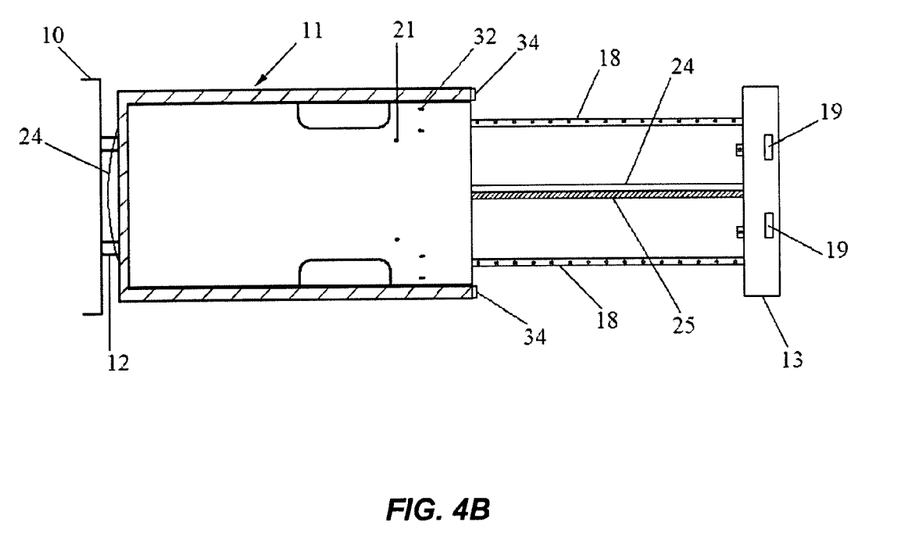
FIG. 4b is a top view of the truck bed extension/ramp assembly without ramp and cargo bed door.
Figure 5A:
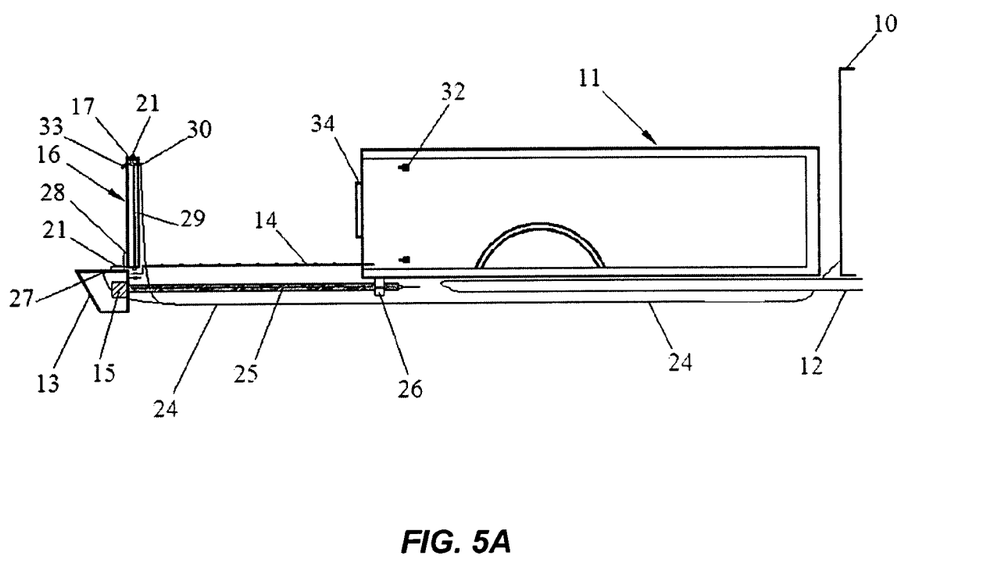
FIG. 5a is a broken left side view of the cargo bed wall, truck frame, and door with opened bumper and without plastic net and bumper shaft.

The motor/housing 15 is placed inside and coupled to the bumper 13 with bolts 21 as illustrated in FIG. 5a. Power to run the motor is supplied through electrical wires 24. A threaded bumper motor shaft 25 is attached to the bumper motor 15 and a threaded exterior motor shaft 26 is attached to the cargo bed floor to receive the bumper motor shaft 25. The bumper shafts 18 and the bumper motor shafts 25 have their extension endings with lower diameter. A bumper motor switch 27 is attached to the bumper 13 to activate the motor 15 coupled to the bumper. The motor 15 when activated rotates the bumper motor shaft 25. Since the bumper motor shaft 25 is threaded, its rotation induces a linear motion. This linear motion will be transmitted to the bumper 13 along with the bumper shafts 18, thereby extending or retracting the truck bed. FIGS. 3 through 4b illustrate the extended truck bed.

Figure 1A:
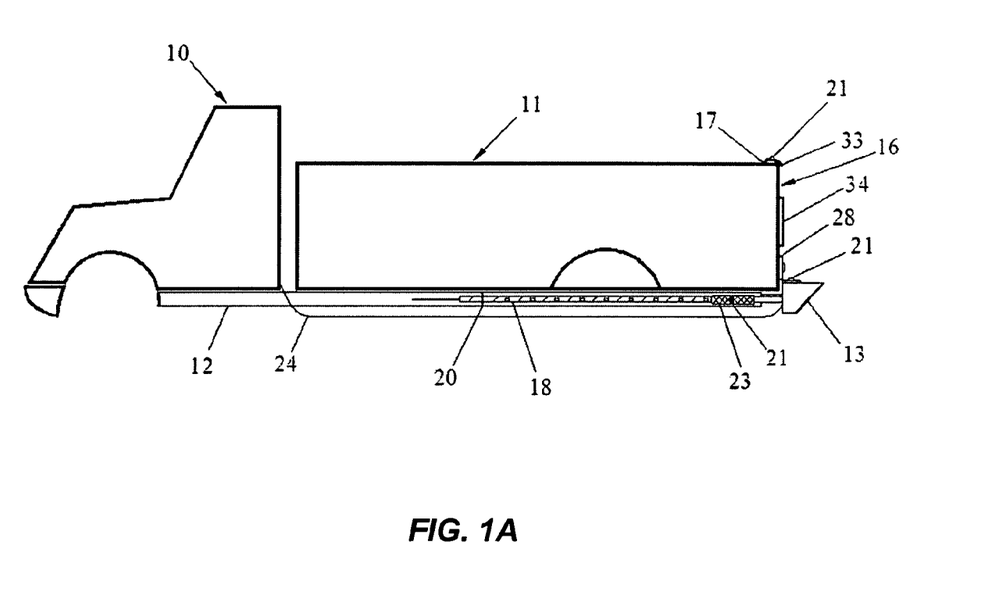
FIG. 1a is a right side view of the truck equipped with the truck bed extension/ramp assembly in accordance with the present invention.
Figure 1B:
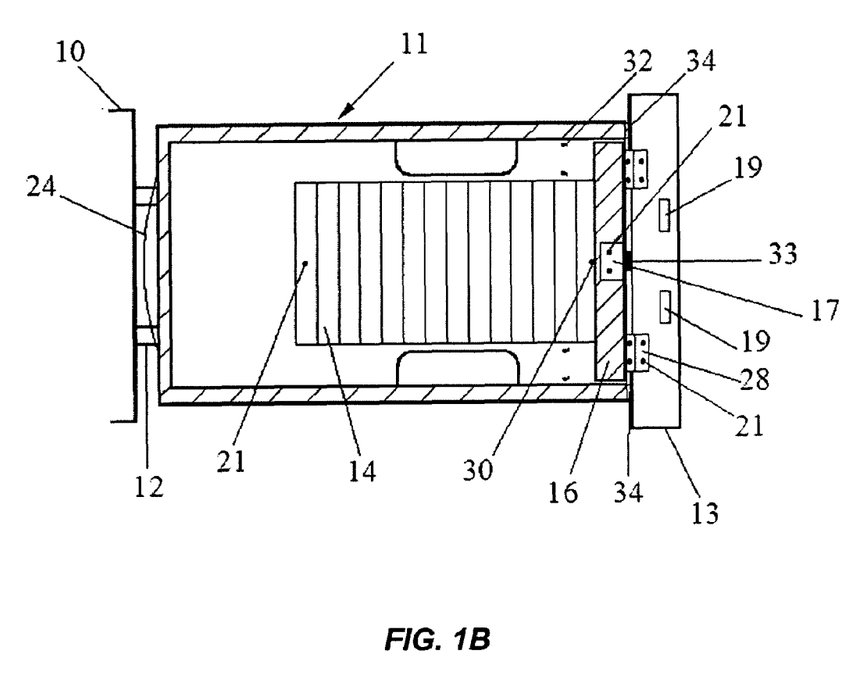
FIG. 1b is a top view of the truck bed extension/ramp assembly with closed bumper.
Figure 2A:
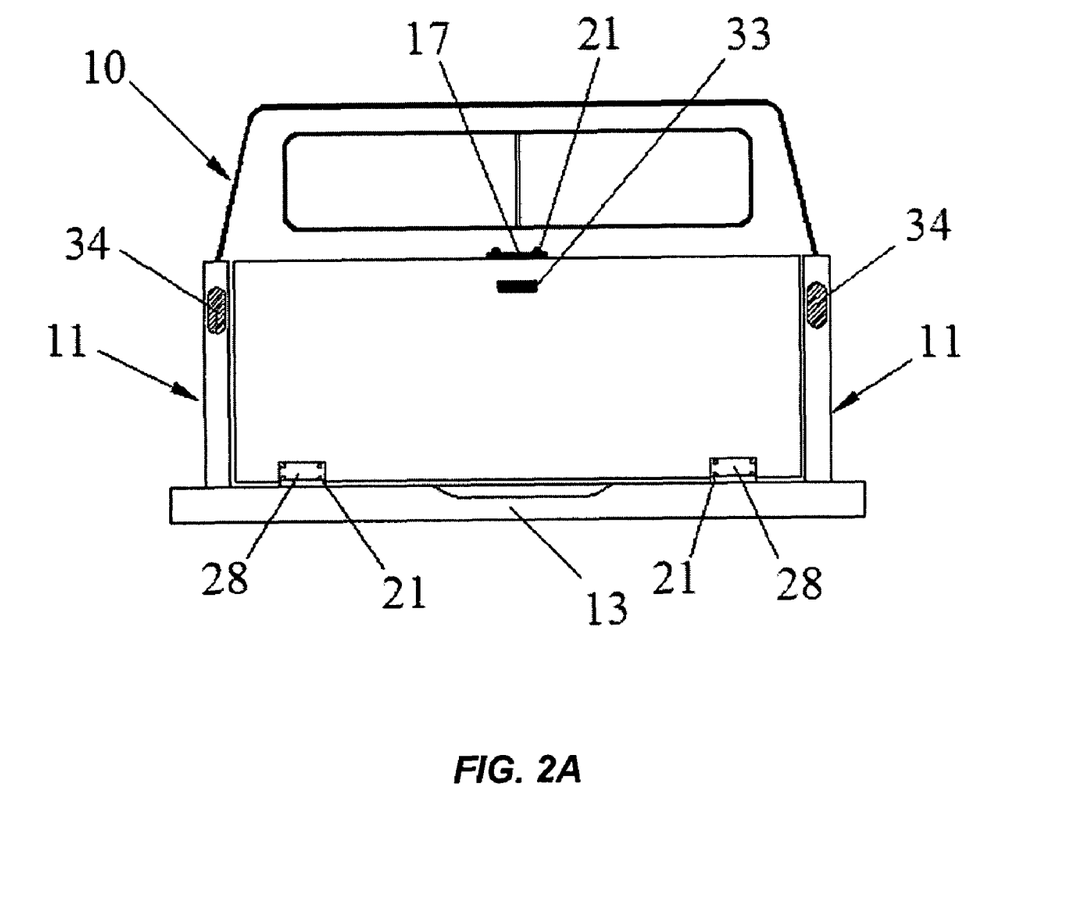
FIG. 2a is a rear view of the truck equipped with the truck bed extension/ramp assembly.
Figure 2B:
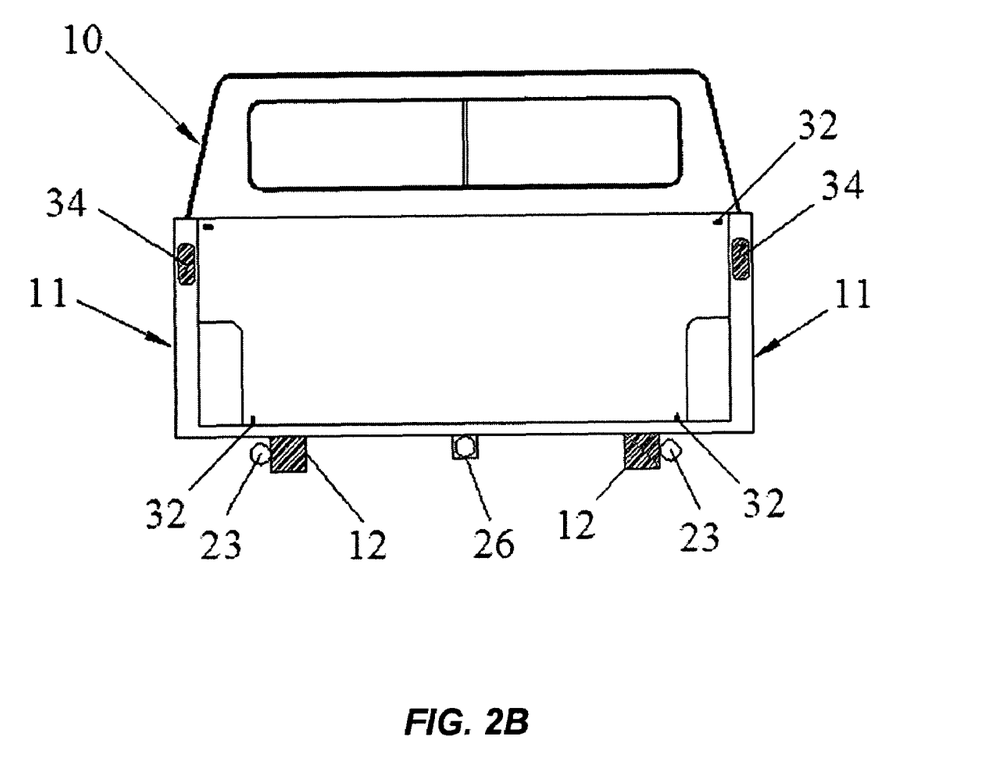
FIG. 2b is a rear view of the truck without cargo bed door.
Figure 5B:
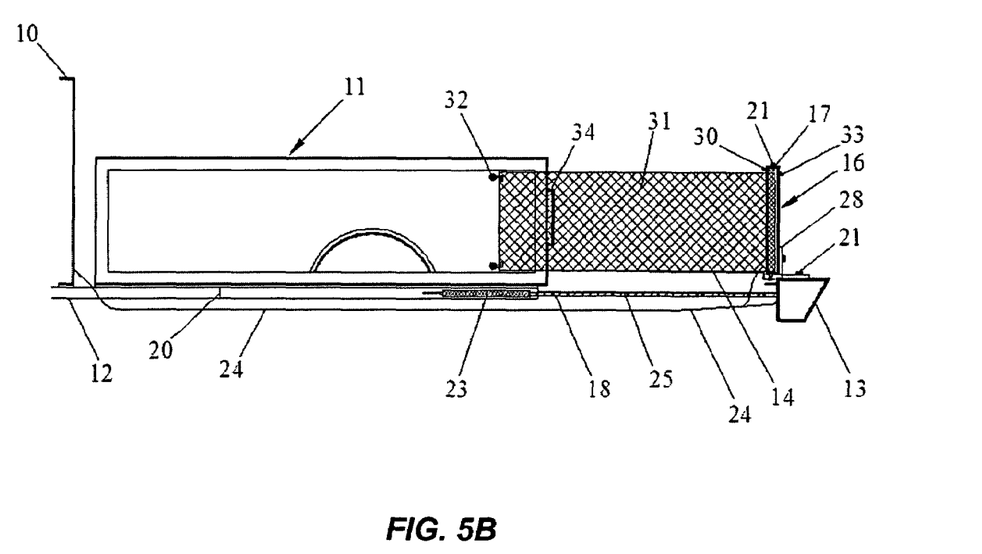
FIG. 5b is a broken right side view of the cargo bed wall and door with opened bumper and plastic net.
Figure 6A:
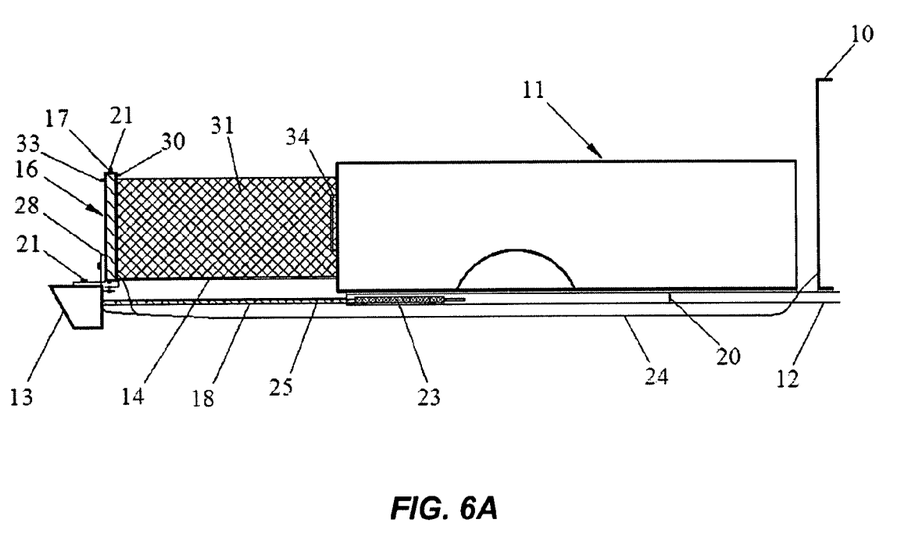
FIG. 6a is a left side view of the truck bed extension/ramp assembly with opened bumper and plastic net.
Figure 6B:
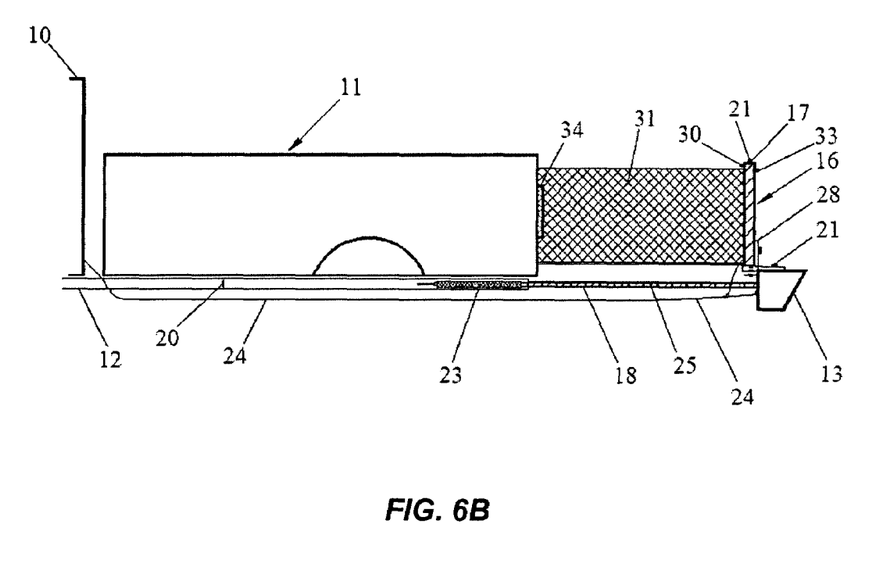
FIG. 6b is a right side view of the truck bed extension/ramp assembly with opened bumper and plastic net.

Referring to FIGS. 1a and 3, a cargo bed door 16 is attached on top of the bumper 13 with two hinges 28 and a plurality of bolts 21. The hinges include a state of the art locking mechanism, and therefore the cargo bed door 16 can be locked in its upright position. A cargo bed door motor/housing 17 is attached on top of the cargo bed door 16 with a plurality of bolts 21 as illustrated in FIGS. 5a & 5b. Power to run the motor is supplied through the electrical wires 24. A cargo bed door motor shaft 29 is attached to the cargo bed door motor 17. A cargo bed door motor switch 30 activates the cargo bed door motor 17, following which the cargo bed door motor shaft 29 rotates. A plastic net 31 is connected to the cargo bed door motor shaft 29. The cargo bed door 16 has two openings from inside (not shown) to receive the piastic net 31. As the cargo bed door motor shaft 29 rotates, the plastic net 31 can be opened or closed (wound or unwound). A plurality of hooks 32 are attached to the cargo bed walls and floor to hold the opened plastic net 31. FIGS. 5b and 6 illustrate the opened plastic net 31.

The electrical wires 24, bumper motor 15, bumper motor switch 27, cargo bed door motor 17, and cargo bed door motor switch 30 are in communication with each other. In a preferred embodiment, the trucks engine and/or a battery can supply power to the bumper motor 15 and cargo bed door motor 17.

Figure 7A:
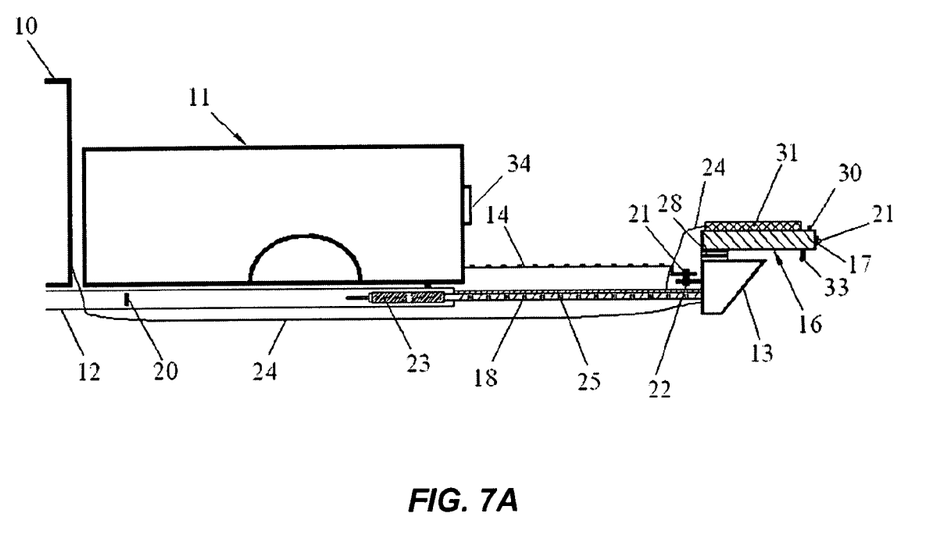
FIG. 7a is a right side view of the truck bed extension/ramp assembly with opened bumper and cargo bed door that is pivotally moved down.
Figure 7B:
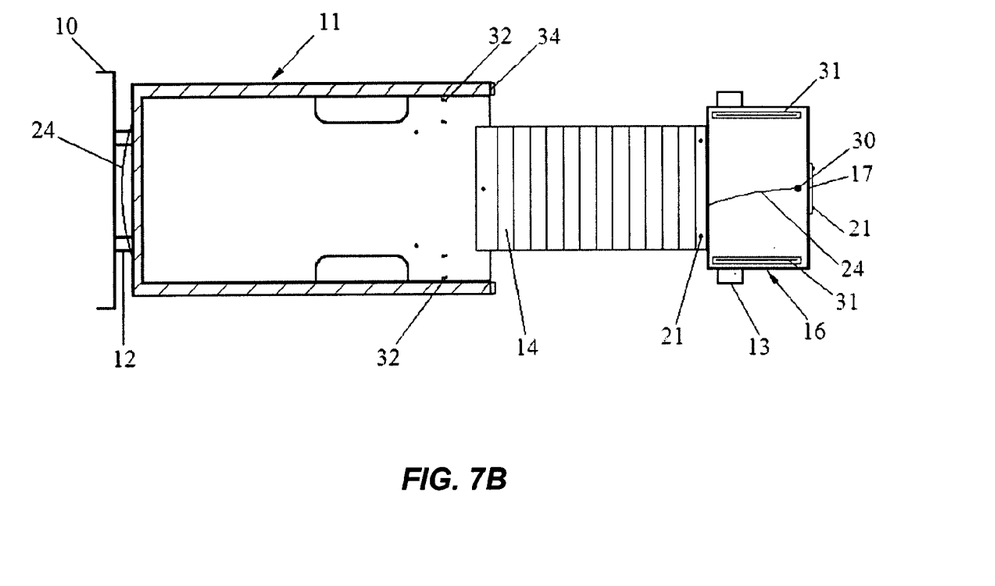
FIG. 7b is a top view of the truck bed extension/ramp assembly with opened bumper and cargo bed door that is pivotally moved down.
Figure 8:
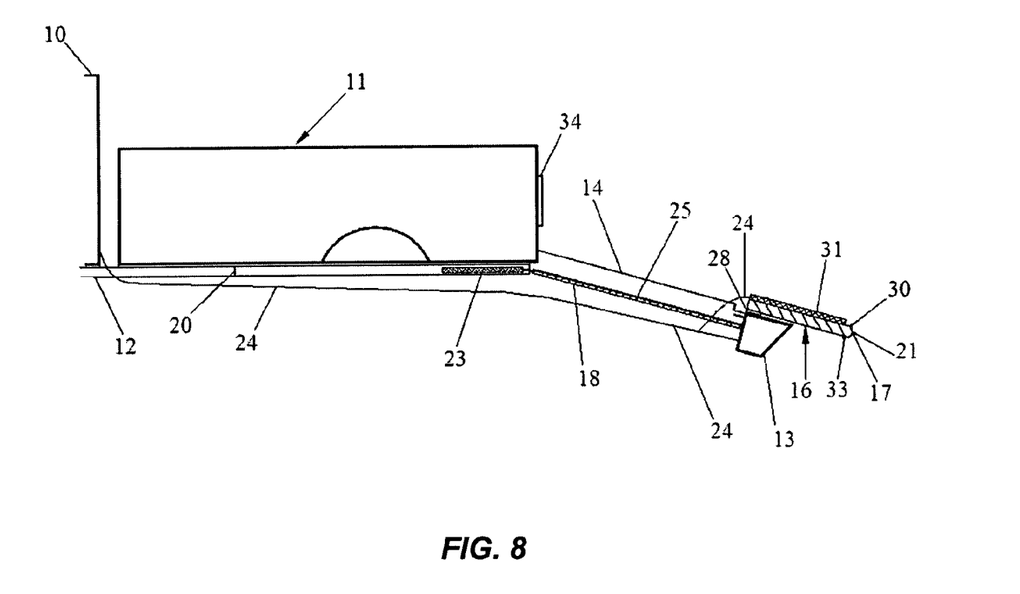
FIG. 8 is a right side view of the truck with opened bumper and pivotally moved cargo bed door acting as a ramp-like structure.
Figure 9:
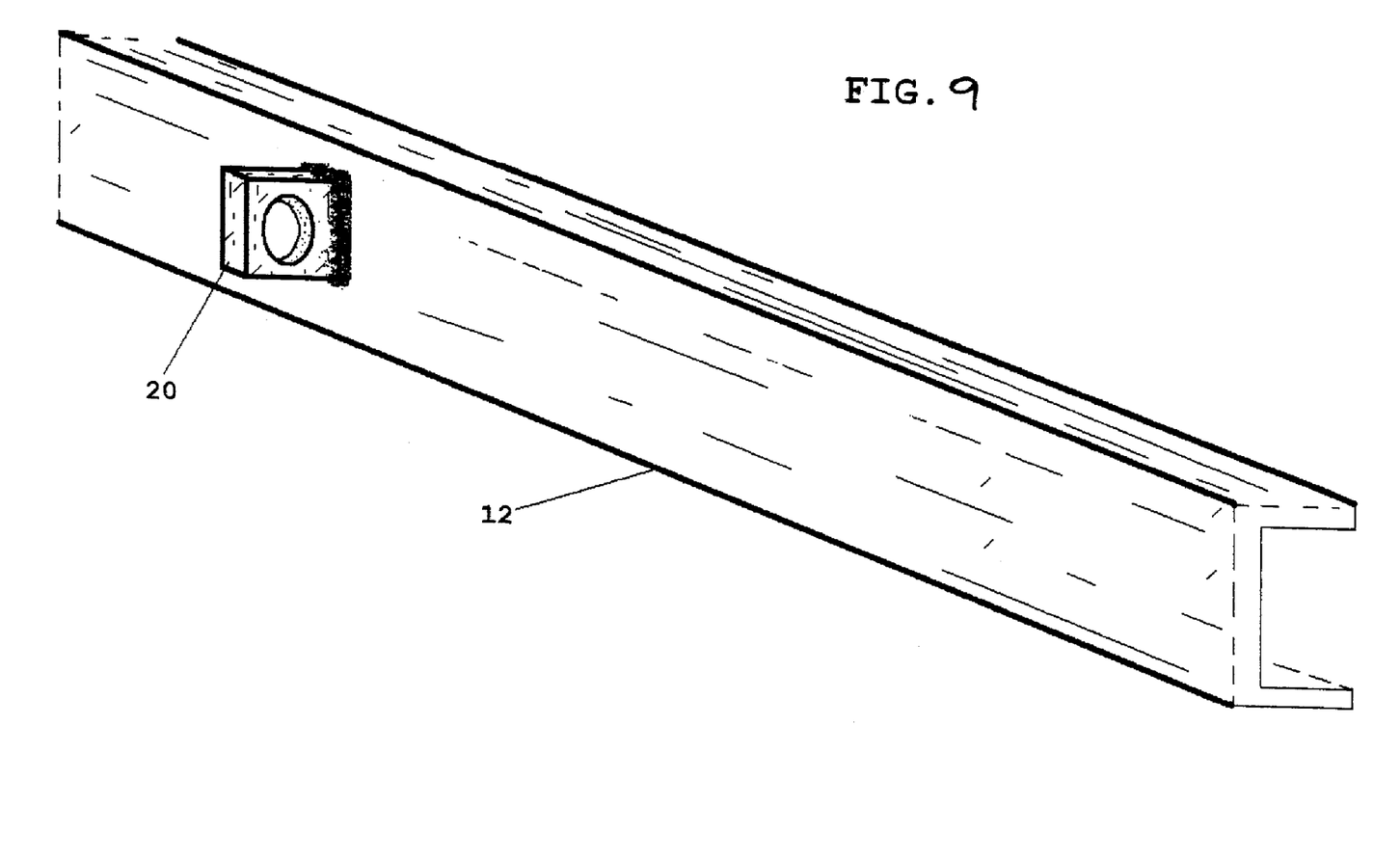
FIG. 9 is a perspective view of a bumper shaft holder.

The truck bed when fully extended can be moved down towards the ground to form a sloping surface, such that the bumper 13 touches the ground. The ends of the bumper shafts and the bumper motor shafts are lower in diameter, so that the bumper shafts and the bumper motor shaft can pivot downward relative to the exterior bumper shafts and exterior motor shaft, respectively. Since the cargo bed door is attached to the bumper 13 with the hinges 28, it can be pivotally moved down and away from the rear end of the truck bed to form an extension parallel to the truck bed as shown in FIGS. 7a and 7b. Therefore, the sloping surface formed by the truck bed in conjunction with the pivotally moved down cargo bed door 16 will act as a ramp-like structure for convenient loading and unloading. This maneuver is illustrated in FIG. 8.

The truck bed extension/ramp assembly of the present invention can be adapted to different types of trucks with varying sizes and designs. Accordingly the structural aspects of the assembly can be adjusted, for example, the number of the bumper shafts can be varied or different types of activation means can be used in conjunction with the motors. Also, a multitude of materials can be used to manufacture different structural elements.

Any element in a claim that does not explicitly state "means for" performing a specified function, or "step for" performing a specific function, is not to be interpreted as a "means" or "step" clause as specified in 35 U.S.C. § 123, paragraph 6. In particular, the use of "step of" in the claims herein is not intended to invoke the provisions of 35 U.S.C. § 123, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An improved truck bed extension and ramp assembly for use with a truck bed, wherein the truck bed comprises a cargo bed, a cargo bed frame, the truck bed extension and ramp assembly comprising;
   a. a plurality of bumper shafts having one of their ends connected to a bumper that is to be installed at the rear end of the truck;
   b. a plurality of exterior bumper shafts attached to the frame to receive the other ends of the bumper shafts such that the bumper shafts can slide inside them;
   c. a plurality of bumper shaft holders attached to the frame to hold the bumper shafts;
   d. a ramp with its rear end attached to the bumper with a fastening means;
   e. a motor coupled to the bumper;
   f. a bumper motor shaft attached to the motor, wherein the motor when activated rotates the bumper motor shaft thereby extending the bumper along with the truck bed;
   g. an exterior motor shaft attached to the cargo bed floor to receive the bumper motor shaft;
   h. a cargo bed door pivotally attached to the bumper with a fastening means such that the cargo bed door is capable of being pivotally moved away from the rear end of the truck bed to form an extension parallel to the truck bed;
   i. a cargo bed door motor attached to the cargo bed door by fastening means;
   j. a cargo bed door motor shaft attached to the cargo bed door motor; and
   k. a plastic net coupled to the cargo bed door motor shaft such that the plastic net winds and unwinds when the cargo bed door shaft rotates as the cargo bed door motor is activated.

2. The improved truck bed extension and ramp assembly of claim 1, wherein the bumper motor shaft and exterior motor shafts are threaded.

3. The improved truck bed extension and ramp assembly of claim 1, wherein the motor coupled to the bumper is installed inside the bumper.

4. The improved truck bed extension and ramp assembly of claim 1, wherein a plurality of hooks are used to hold the plastic net in its opened position.

5. The improved truck bed extension and ramp assembly of claim 1, wherein each of the motors is activated by a switch.

6. The improved truck bed extension and ramp assembly of 1, wherein the bumper is provided with provisions for a human hand to fit in and hold the bumper.

\* \* \* \* \*